United States Patent [19]
Tanaka

[11] Patent Number: 5,934,780
[45] Date of Patent: *Aug. 10, 1999

[54] POLARIZED LIGHT IRRADIATION DEVICE FOR PURPOSES OF OPTICAL ALIGNMENT OF AN ALIGNMENT LAYER OF A LIQUID CRYSTAL CELL ELEMENT

[75] Inventor: Yoneta Tanaka, Yokohama, Japan

[73] Assignee: Ushiodenki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/928,335

[22] Filed: Sep. 12, 1997

[30] Foreign Application Priority Data

Sep. 12, 1996 [JP] Japan ................... 8-242121

[51] Int. Cl.$^6$ ............................................. G02B 5/30
[52] U.S. Cl. ..................... 362/19; 362/268; 430/20; 430/22; 439/124; 359/487
[58] Field of Search .............. 362/19, 268; 430/20, 430/22; 349/124, 5; 359/487, 488

[56] References Cited

U.S. PATENT DOCUMENTS

5,535,054  7/1996  Shibuya ................... 359/487
5,674,650  10/1997  Dirksen et al. ........... 430/22
5,748,369  5/1998  Yokota .................... 362/19
5,827,629  10/1998  Miyatake ................. 430/22

*Primary Examiner*—Thomas M. Sember
*Attorney, Agent, or Firm*—Sixbey, Friedman, Leedom & Ferguson; David S. Safran

[57] ABSTRACT

A polarized light irradiation device in which formation of an alignment layer of a liquid crystal cell element is enabled by optical alignment is obtained by the fact that light which contains UV light and which is emitted from a discharge lamp is focused by an oval focusing mirror and is reflected by a first flat mirror. This light is incident via a shutter on an integrator lens. The light emerging from the integrator lens is reflected by a second flat mirror and is converted into parallel light by a collimation lens, and is incident in the polarization element. In the polarization element, there are several glass plates spaced parallel to one another and inclined by the Brewster angle relative to the incident light. The polarization element transmits the P-polarized light and reflects the S-polarized light for the most part. The P-polarized light which has emerged from the polarization element irradiates a workpiece via a mask.

3 Claims, 8 Drawing Sheets

FIG. 1

Polarized light irradiation device

Figure 8:
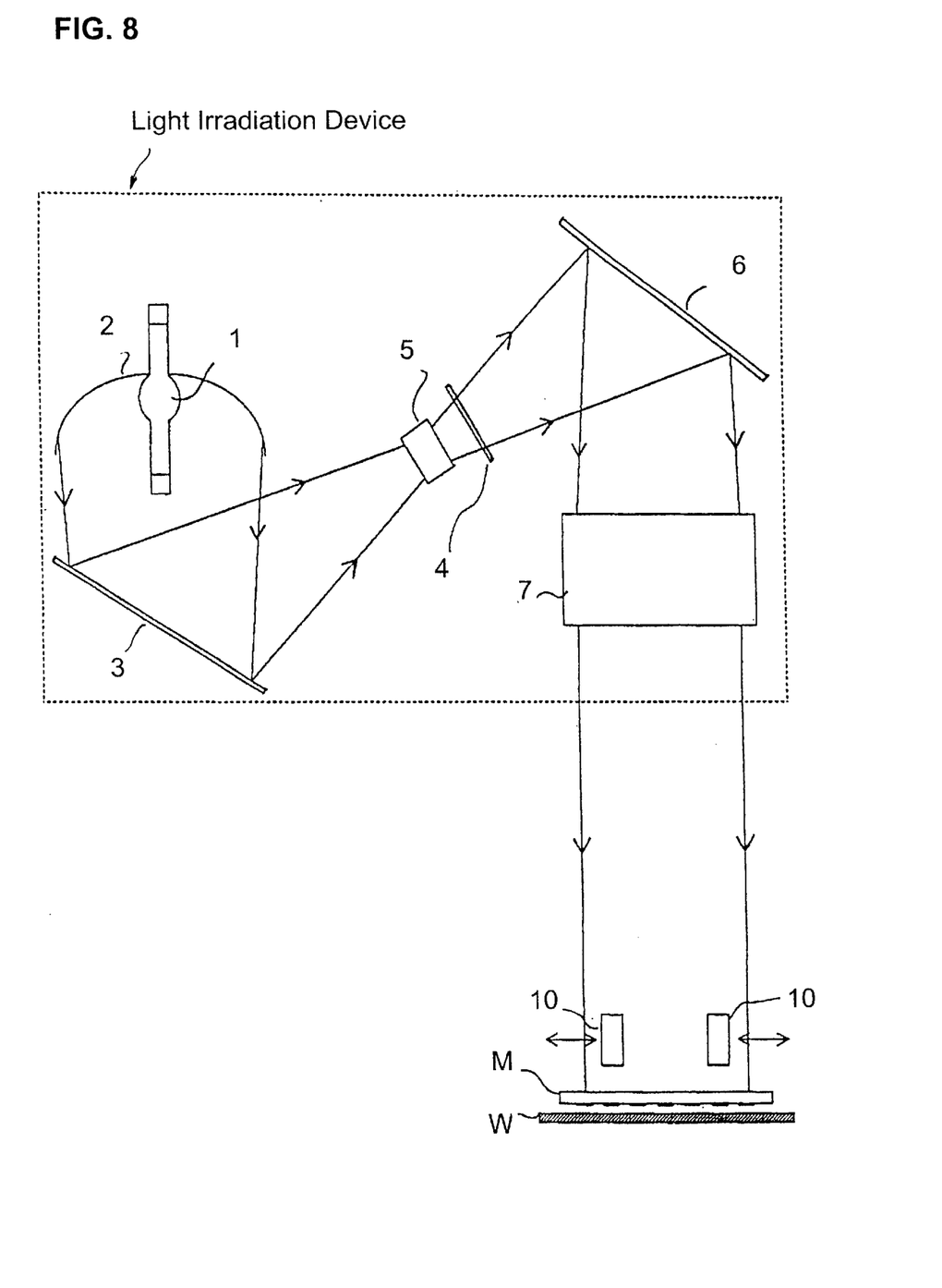
FIG. 8 shows a schematic of a known arrangement of a light irradiation device.

FIG. 9 a focusing mirror 2, a first flat mirror 3, an integrator lens 5, a shutter 4, a second flat mirror 6 and a collimation lens 7. Light which contains the ultraviolet light emitted from discharge lamp 1 is focused by oval focusing mirror 2, is reflected by first flat mirror 3, and is incident on integrator lens 5. The light emerging from integrator lens 5 is reflected via shutter 4 and then by second flat mirror 6, is converted into parallel light by means of collimation lens 7, and emerges from the light irradiation device. The parallel light emerging from the light irradiation device is emitted via mask M onto a workpiece W, such as a liquid crystal substrate or the like. Furthermore, to irradiate workpiece W with light via mask M, on which a stipulated pattern is formed, and to expose only one predetermined position of the workpiece W, it is necessary to obtain parallel light by means of collimation lens 7, and thus, to irradiate mask M and workpiece W as is described above.

POLARIZED LIGHT IRRADIATION DEVICE FOR PURPOSES OF OPTICAL ALIGNMENT OF AN ALIGNMENT LAYER OF A LIQUID CRYSTAL CELL ELEMENT

BACKGROUND OF THE INVENTION

1. Field of the Invention

The invention relates to a polarized light irradiation device for purposes of optical alignment of an alignment layer of a liquid crystal cell element by irradiation with polarized light. The invention relates especially to a polarization light irradiation device for purposes of optical alignment of an alignment layer in which irradiation of a large workpiece with polarized light can be achieved.

2. Description of Related Art

The liquid crystal cell element usually consists of two substrates. On one substrate, a driver system for triggering the liquid crystal (for example, a thin film transistor) and electrodes for triggering the liquid crystals which are composed of transparent conductive films, and an alignment layer or the like for aligning the liquid crystal in a certain direction are formed. On the other of these substrates, a light screening film, which is called a black matrix, is formed. In a color liquid crystal cell element, a color filter and the above described alignment layer are formed.

The alignment layer is usually produced by subjecting the surface of a thin film, such as polyamide resin or the like, to a treatment which is called rubbing, and providing it with grooves in a certain direction; this is designed to align the molecules of the liquid crystals along these fine grooves in a certain direction. In the above described rubbing treatment, a process is widely used in which the alignment layer is produced by rubbing the substrate with a cloth wound around a rotating roller.

The above described formation of the alignment layer is accomplished by rubbing the substrate with the cloth as the rubbing medium. Therefore, here, adverse effects, such as dust, static electricity, scratches and the like cannot be avoided, nor can a decrease of yield.

Recently, therefore, a technique was proposed in which the alignment of the liquid crystals is produced without the above described rubbing (the alignment technique without rubbing is hereinafter called "nonrubbing").

In this nonrubbing technique, there is a process using polarization. In this process, the thin film, such as polyamide or the like, is irradiated with polarized light, the polymer of the thin film is subjected to chemical conversion in a certain direction and thus alignment is accomplished.

To use this technique to form the alignment layer of the liquid crystal substrate, however, a large polarized light irradiation device is necessary. This means that, in the case of producing the liquid crystal cell elements conventionally, four to six liquid crystal cell elements are formed on the substrate. The size of the substrate as the object of light irradiation is therefore conventionally roughly 550 mm×650 mm. Therefore, an area of roughly 800×800 mm is needed; it is irradiated by the polarized light irradiation device which is used to form the alignment layers of the liquid crystal substrates. To date there has not been any polarized light irradiation device which irradiates such a large area.

FIG. 8 schematically shows the arrangement of a light irradiation device for emitting ultraviolet rays as the prerequisite of the invention. The light irradiation device conventionally comprises, as shown in the drawing, a discharge lamp 1, such as super high pressure mercury lamp 1, an oval Furthermore, reference number 10 designates an alignment microscope by which alignment marks of mask M and alignment marks of workpiece W are observed, and by which the mask M is aligned with respect to workpiece W. Afterwards, ultraviolet light is emitted from the above described light irradiation device and directed through mask M. Furthermore, instead of the above described second flat mirror and collimation lens 7, collimation mirrors can be used which consist of concave mirrors.

The emergence of polarized light from the above described light irradiation device is enabled by the arrangement of a polarization element which is located in the optical path between oval focusing mirror 2 and mask M, and which polarizes the light. Here, however, depending on the location at which the polarization element is located, the following disadvantages arise:.

Figure 9:
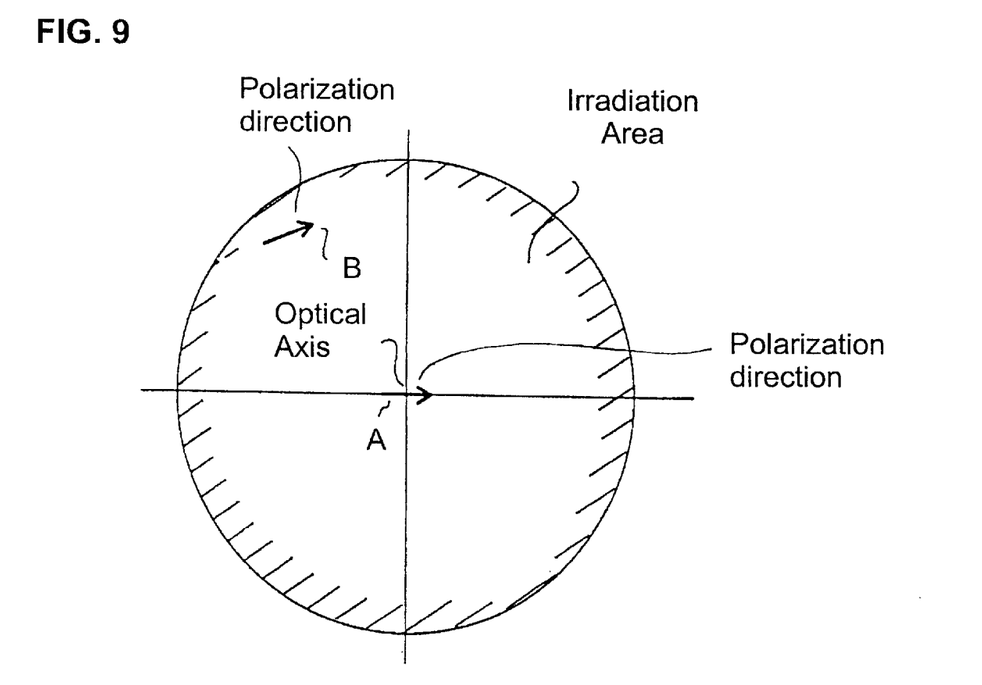
FIG. 9 shows a schematic of the polarization directions when a polarization element is located at a site where the light is not parallel light.

(1) If there is a polarization element in front of collimation lens 7 where there is still no parallel light, some of the polarized light irradiating workpiece W is deflected to one polarization direction on the irradiated surface on the optical axis with a certain angle. This means that, in the manner shown in FIG. 9, a polarization device according to arrow B in crosshatched area is tilted, for example, to one polarization direction on an irradiated surface around the optical axis according to arrow A.

If the substrate is irradiated with this light which has polarization directions which are not uniform as described above, the direction in which the alignment layer is aligned is no longer uniform. The images obtained by the liquid crystal cell element which is provided with the alignment layer with nonuniform alignment directions exhibit scattering of the shade and contrast, depending on the pertinent locations.

Therefore, there is a requirement for uniformity of the polarization directions of the polarized light with which the substrate is irradiated. It is necessary to arrange the polarization element between collimation lens 7 and mask M, where the light is parallel. Furthermore, in the case of using the collimation mirror it is desirable to arrange the polarization element between the collimation mirror and mask M.

(2) If instead of above described second flat mirror 6 and collimation lens 7, metallic collimation mirrors are used, or if a metallic mirror is used as a second flat mirror 6, and if the polarization element is placed in front, the light with which workpiece W is irradiated is converted into an oval polarization, causing the same defects as described above.

(3) If at the output of integrator lens 5 with high illumination intensity the polarization element is arranged, the polarization element is more frequently degraded by the UV light.

As was described above, the problem of nonuniformity of the polarization directions or the like occurs when the polarization element is located in front of collimation lens 7. It is therefore necessary to place the polarization element between collimation lens 7 and mask M in order to allow the polarized light to emerge from the light irradiation device shown in FIG. 8.

But, in the case in which the polarization element is located between collimation lens 7 and mask M, a polarization element with a size which is essentially equal to or larger than the size of workpiece W must be used.

The following are known as large polarization elements in this sense:

(1) a polarization element using resin (polymer); and
(2) a polarization element in which glass or a plastic film is provided with a vacuum evaporated film.

The polarization element according to (1) is often degraded by the UV light. The polarization element according to (2) has a narrow wave band in which polarization is possible. Furthermore, it is considered disadvantageous that, for a low incline of the polarization element, the wave band in which polarization is possible is shifted, and that, in this way, calibration during installation into the above described light irradiation device is difficult. In addition, there is the possibility of loosening or degradation of the vacuum evaporated film, making maintenance difficult.

SUMMARY OF THE INVENTION

The invention was devised with consideration of the above described disadvantages. Therefore, a primary object of the invention is to devise a polarized light irradiation device in which a large workpiece can be irradiated with polarization light with uniform polarization directions and in which an alignment layer of a liquid crystal cell element can be formed by optical alignment.

If parallel light is incident on a glass plate which is inclined by the Brewster angle, one component of horizontal polarization P (hereinafter called "P-polarized light") is 100% transmitted by the glass plate, while one component of the vertical polarization S (hereinafter called "S-polarized light") is roughly 85% transmitted. The term "Brewster angle" is defined as the angle of incidence of light in which the reflection factor of the P-polarized light is 0.

Figure 2:
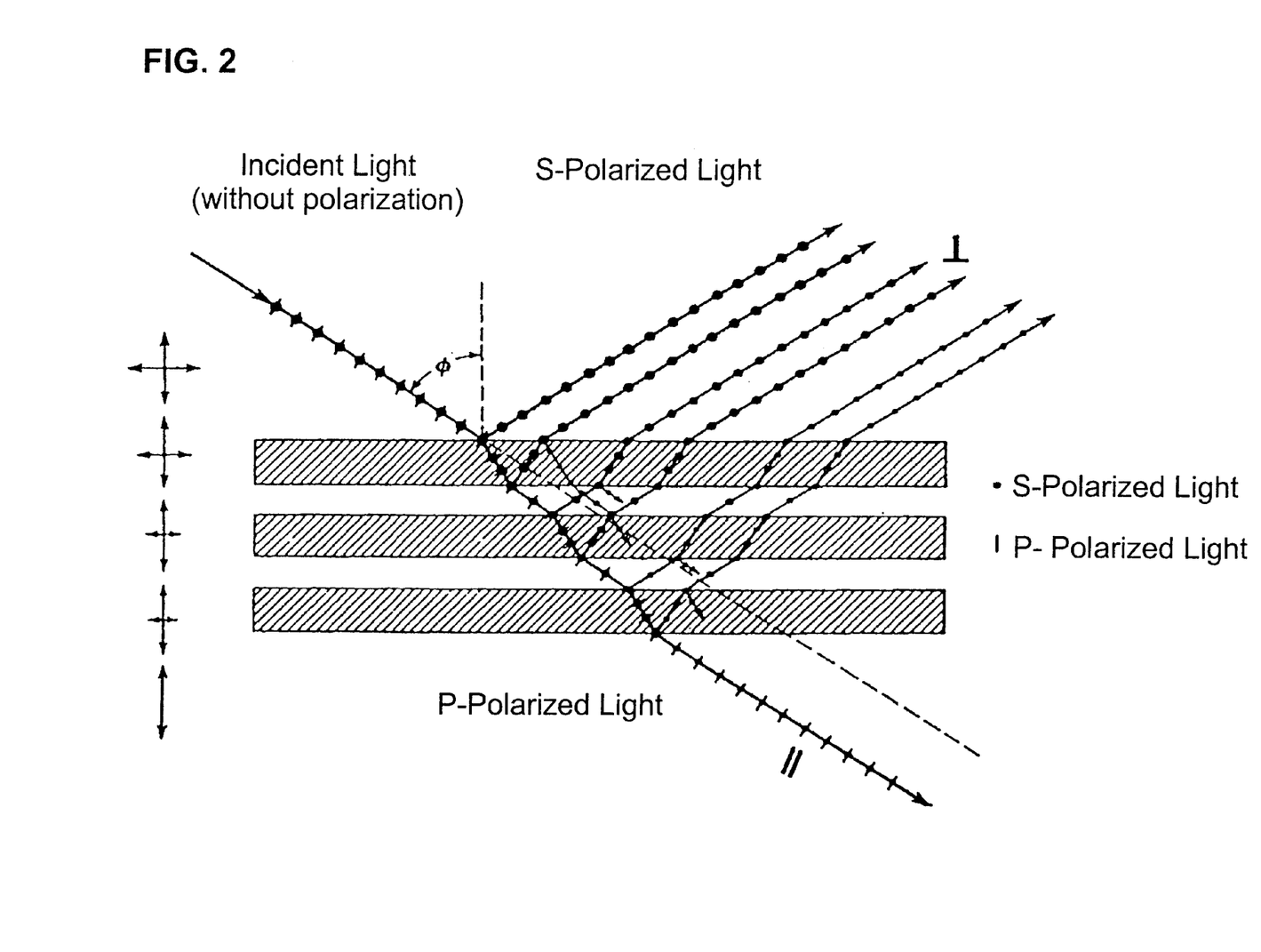
FIG. 2 is a schematic diagram of the S-polarized light and the P-polarized light when light inclined by the Brewster angle is incident in glass plates which are located parallel to one another at a distance.

Therefore, by placing several glass plates at a distance to one another and by the incidence of light with an inclination by the Brewster angle $\phi$ in the glass plates, the ratio of the P-polarized light to the S-polarized light from the light which is passed by the glass plates can be increased, as illustrated in FIG. 2.

If, using the above described principle, several glass plates are each spaced parallel to one another, and if these glass plates are arranged inclined with reference to parallel light by the Brewster angle, a relatively large polarization element is formed and a large workpiece, such as a liquid crystal cell element or the like, can be irradiated with polarized light with uniform polarization directions.

For purposes of optical alignment of an alignment layer of a liquid crystal cell element, it is usually necessary to satisfy the following conditions:

(1) For optical alignment of the alignment layer of the liquid crystal cell element, it is necessary to fix the ratio of the S-polarized light relative to the P-polarized light which is emitted onto the workpiece, that is, S/P, at less than or equal to a stipulated value.
(2) In the light irradiation device with the arrangement shown in FIG. 8, the degree of parallelism of the central light beam is conventionally ±1° and the angle of vision is roughly ±2°. Furthermore, an error of roughly ±2° of the installation angle in the slanted arrangement of the glass plates is expected. Therefore, it is possible that light inclined by roughly ±5° relative to the Brewster angle is incident on the glass plates. It is therefore necessary that, with regard to the light inclined by ±5° with respect to the above described Brewster angle, the attenuation coefficient of the light at the polarization element is less than or equal to a stipulated value in order to effect optical alignment of the alignment layer of the liquid crystal cell element with high efficiency.

As a result of various examinations of above described conditions (1) and (2), it was found that an application for optical alignment of the alignment layer of the liquid crystal cell element is enabled when ratio S/P for (1) is less than or equal to 0.1, and if the attenuation coefficient with respect to light which is inclined by ±5° to the Brewster angle at (2) is less than or equal to ½.

Therefore, an examination which satisfies above described conditions (1) and (2) with respect to the number of glass plates of the polarization element was performed. It indicated that the above described conditions can be satisfied if a feasible, stipulated number of glass plates are spaced parallel to one another, as is described below.

Furthermore, for this reason, glass plates with a high internal transmission factor with respect to ultraviolet light of 365 nm wavelength (which has a great effect for optical alignment) can be preferably used. It is advantageous to use quartz glass which has an internal transmission factor of greater than or equal to 98% with respect to UV light of 365 nm wavelength for the above described glass plates.

The polarizable wavelength range is not limited by the above described formation of the polarization element of several transparent glass plates which are each arranged in parallel at a distance to one another, as is the case in the polarization element using the above described vacuum evaporated film. In this way, an arrangement of a wavelength selective filter in front of the polarization element is made superfluous. Furthermore, there is no danger of loosening or degradation of the vacuum evaporated film, as is the case in the polarization element using the above described vacuum evaporated film.

As claimed in the invention, a polarized light irradiation device is indicated in the above described manner, in which a large workpiece, such as a liquid crystal cell element or the like, can be irradiated with polarized light with uniform polarization directions.

The object is achieved as follows as claimed in the invention:

(1) In a light irradiation device which has a lamp which emits light which contains UV light, a focusing mirror which focuses the light from the lamp, an integrator lens and a collimation lens or collimation mirror, on the exit side of the collimation lens or the collimation mirror there is a polarization element in which there are several glass plates which are parallel to one another at a distance and inclined by the Brewster angle to the primary light beam, the number of glass plates of the polarization element being fixed such that the ratio of the component of the vertical polarized light S to the component of parallel polarized light P, i.e., ratio S/P, is less than or equal to 0.1, and that attenuation of the light with parallel polarization P with reference to the incident light with an inclination of ±5° to the above described Brewster angle is less than or equal to ½.
(2) The above described glass plates are formed from quartz glass.

DETAILED DESCRIPTION OF THE PREFERRED EMBODIMENT

Figure 1:
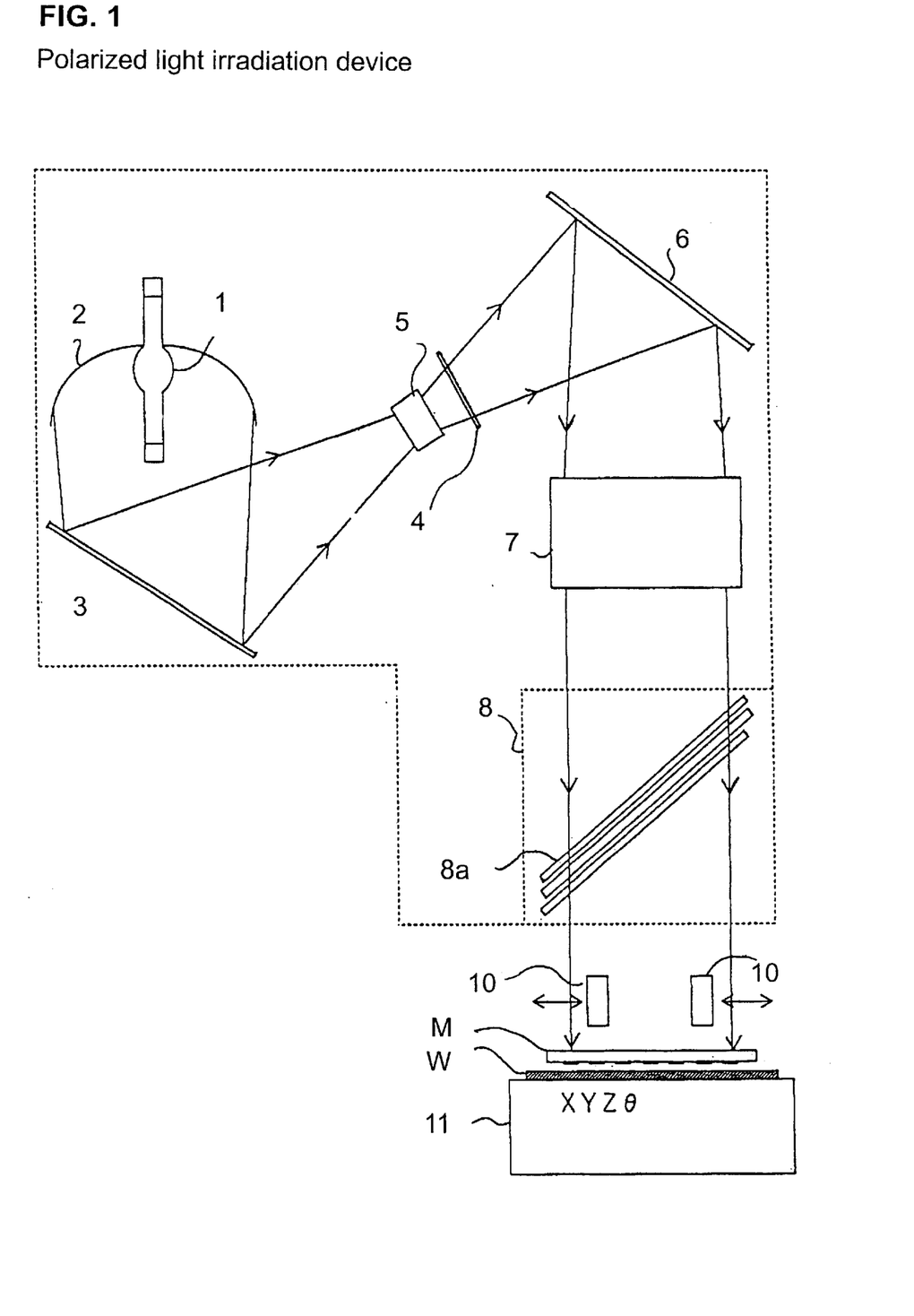
FIG. 1 shows a schematic of the arrangement of one embodiment of the polarized light irradiation device of the invention.

FIG. 1 is an arrangement of an embodiment of the polarized light irradiation device of the present invention in which the same parts as in FIG. 8 bear the same numbers to facilitate comparison with the prior device and to minimize the need to describe aspects already commented on above. The polarized light irradiation device of this embodiment has a discharge lamp 1, such as a super high pressure mercury lamp or the like, an oval focusing mirror 2, a first flat mirror 3, a shutter 4, an integrator lens 5, a second flat mirror 6, a collimation lens 7 and a polarization element 8.

For polarization element 8, there are several glass plates 8a which are arranged parallel to and at a distance from one another, as is shown in FIG. 2. Glass plates 8a are inclined by the Brewster angle to the parallel light emerging from collimation lens 7.

In the drawing, the light, which contains UV light, is emitted from discharge lamp 1, focused by the focusing mirror 2, reflected by first flat mirror 3 and incident via shutter 4 on integrator lens 5. The light emerging from integrator lens 5 is reflected furthermore by the second flat mirror 6, then converted into parallel light by means of collimation lens 7, from which it is incident in polarization element 8. Polarization element 8 transmits the P-polarized light and reflects the S-polarized light for the most part, as was described above. The light which emerges from polarization element 8 is therefore converted mainly into P-polarized light.

The P-polarized light is emitted via a mask M onto a workpiece W, such as a liquid crystal substrate or the like. Also, an alignment microscope 10 is provided for alignment of the mask M and workpiece W, with a workpiece carrier 11 that is movable in the X-Y-Z-Θ directions (X is axis parallel to the workpiece surface, Y is axis orthogonally intersecting the X axis parallel to the workpiece surface, Z is axis orthogonally intersecting the X-Y axes, and Θ is the axis of rotation around the Z axis). The workpiece is placed on workpiece carrier 11.

In the above described polarized light irradiation device the following was determined:

(1) Number of glass plates of the polarization element for which the ratio of S-polarized light to P-polarized light S/P is less than or equal to 0.1.

(2) Number of glass plates of the polarization element for which the attenuation coefficient with respect to light with an inclination of ±5° relative to the Brewster angle is less than or equal to ½.

Figure 3:
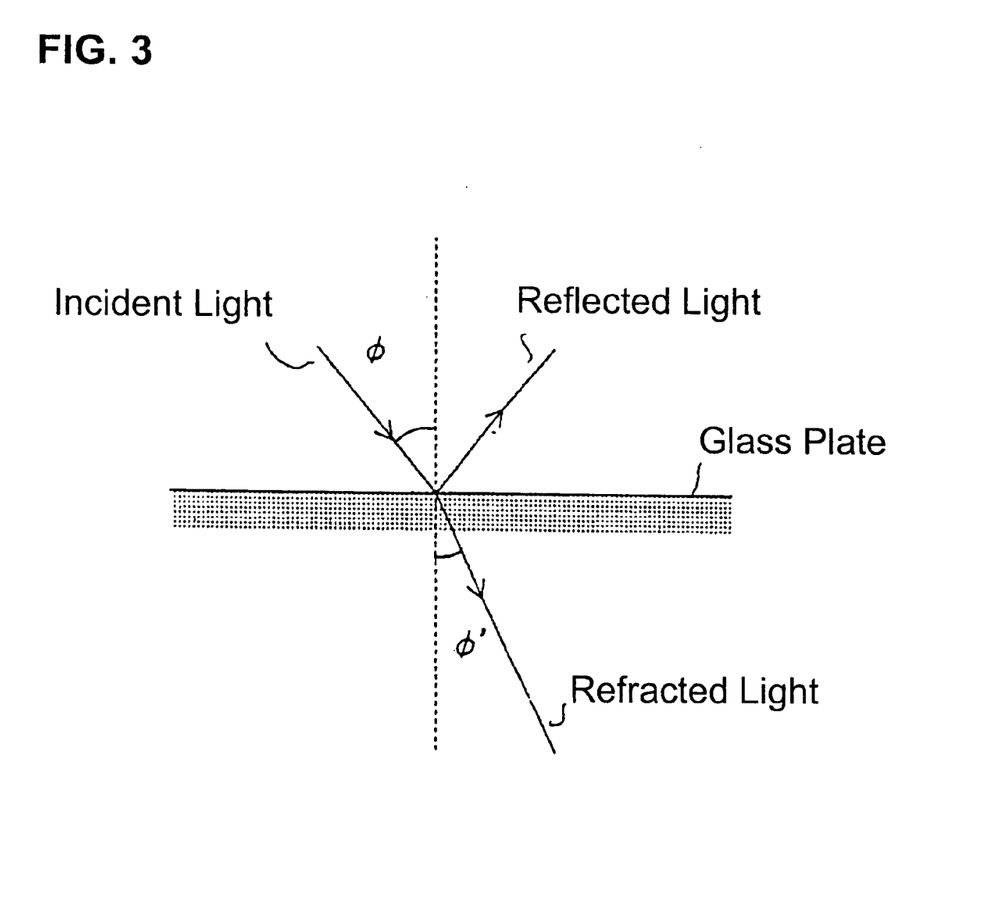
FIG. 3 shows a schematic of the state in which the light has been incident on a glass plate.

This number of glass plates can be determined in the manner described below:

As is shown in FIG. 3, the intensity of the reflected light rs of the S-polarized light is shown according to following equation (1) and the intensity of the reflected light rp of the P-polarized light is shown according to following equation (2), where the angle of the incident light is the Brewster angle $\phi$ and the angle of the refracted light is $\phi'$. Here, Rs is the reflected component of the S-polarized light and Rp the reflected component of the P-polarized light, Es is the incident component of the S-polarized light and Ep is the incident component of the P-polarized light. Rs/Es and Rp/Ep are described according to following equations (3) and (4).

$$rs = (Rs/Es)^2 \quad (1)$$

$$rp = (Rp/Ep)^2 \quad (2)$$

$$Rs/Es = \sin(\phi - \phi')/\sin(\phi + \phi') \quad (3)$$

$$Rp/Ep = \tan(\phi - \phi')/\tan(\phi + \phi') \quad (4)$$

The intensity of the light which transmits the S-polarized light is described according to the following equation (5), based on above described equation (1). The intensity of the light which transmits the P-polarized light is described according to following equation (6), based on equation (2) described above:

$$1 - rs = 1 - (Rs/Es)^2 \quad (5)$$

$$1 - rp = 1 - (Rp/Ep)^2 \quad (6)$$

If several glass plates are used, several interfaces are obtained. In this case, the above described equations (5) and (6) can be raised to the power of the number of interfaces MLT.

The intensity of the S-polarized light and the intensity of the P-polarized light which are transmitted by the polarization element which is formed of several glass plates can, therefore, be described according to following equations (7) and (8). The number of interfaces MLT is twice the number of glass plates because there are two interfaces per glass plate, i.e., one front surface and one back surface of a glass plate.

The intensity of the transmitted S-polarized light is $$\{1 - (Rs/Es)^2\}^{MLT} \quad (7)$$

The intensity of the transmitted P-polarized light is $$\{1 - (Rp/Ep)^2\}^{MLT} \quad (8)$$

Using the above described equations the number of glass plates which satisfies above described condition (1) was determined and it was found that the required number of glass plates is greater than or equal to 8.

Figure 4:
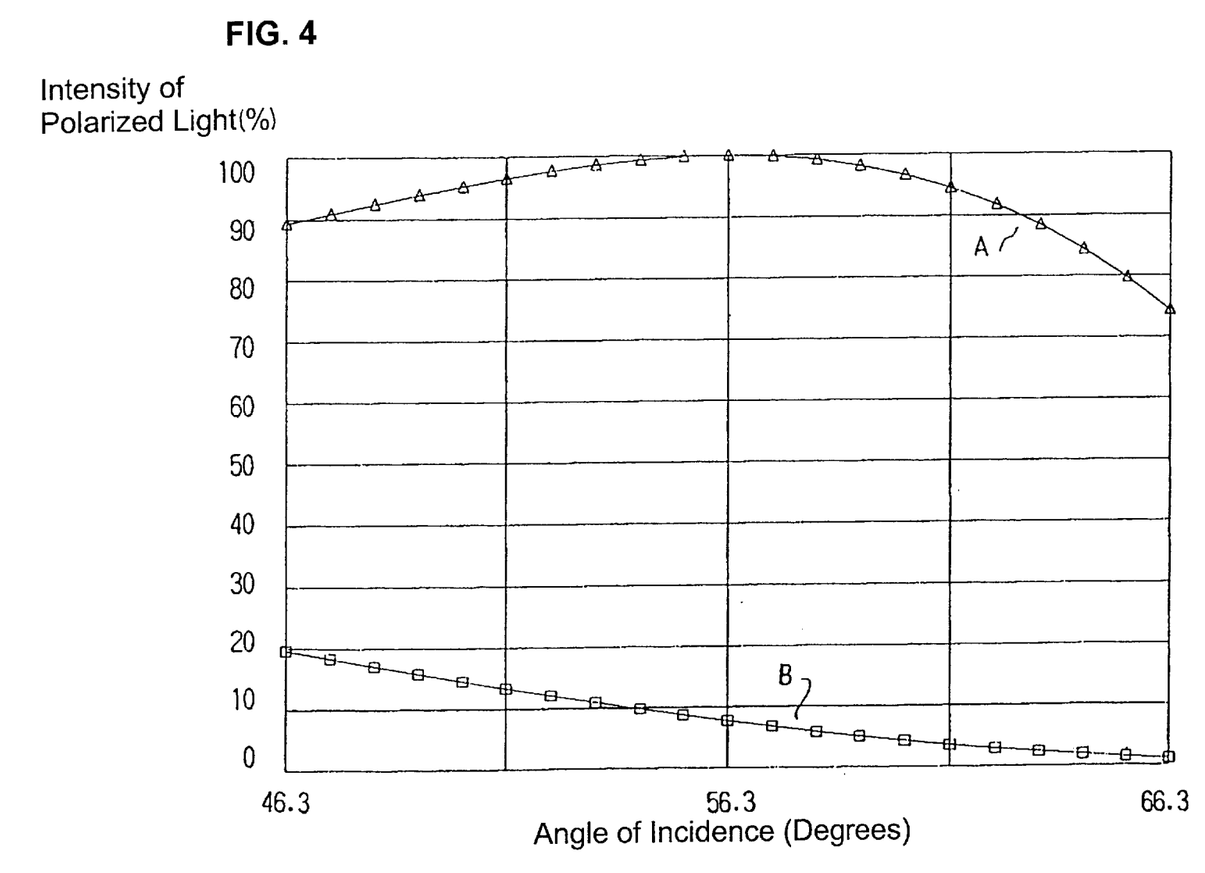
FIG. 4 is a graph showing the characteristic of a polarization element which is formed of eight glass plates.

FIG. 4 is a schematic representation of the characteristic of a polarization element which consists of eight glass plates arranged parallel to one another, the X-axis representing the angle of the light which is incident in the glass plates which form the above described polarization element, and the y-axis the intensity of the polarized light which is transmitted by the polarization element. In the figure, A labels the P-polarized light and B the S-polarized light. Furthermore, in the figure, the refraction coefficient of the glass plates to set to 1.5 and the determination is done.

As is apparent from the drawing, by forming the polarization element from eight glass plates, the ratio S/P can be fixed at less than or equal to 0.1. When the number of glass plates is increased, the ratio S/P becomes accordingly smaller. Therefore, the above described condition (1) can be satisfied when the polarization element is formed from at least eight glass plates.

Next, the number of glass plates which satisfies condition (2) was determined according to the above described equations, and it was found that it is less than or equal to 98.

Figure 5:
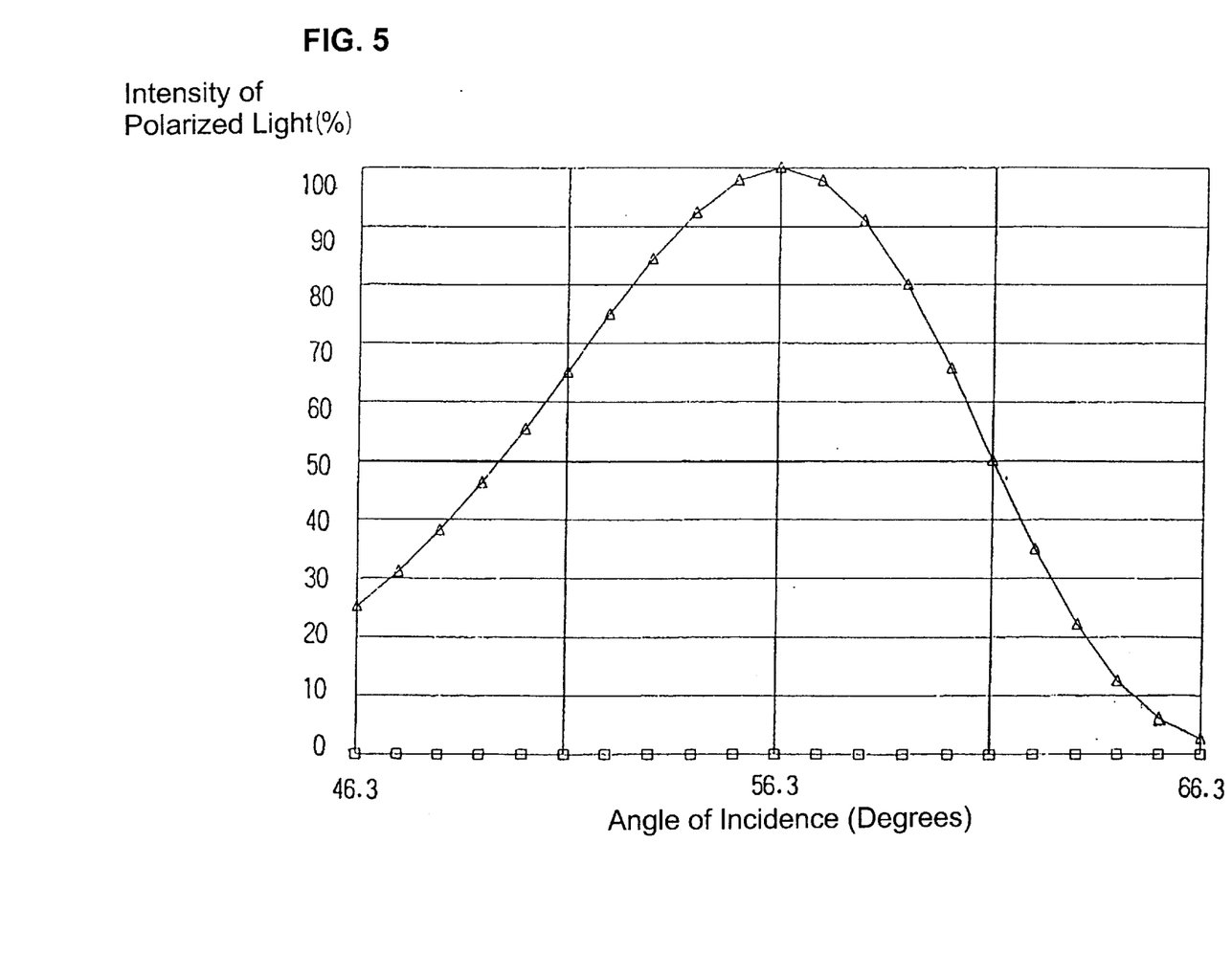
FIG. 5 is a graph depicting the characteristic of a polarization element which is formed of 98 glass plates.

FIG. 5 is a schematic of the characteristic of a polarization element which is formed of 98 glass plates that are parallel to one another. Here, as in FIG. 4, the x-axis represents the angle of the light which is incident in the glass plates which form the above described polarization element, and the y-axis the intensity of the P-polarized light which is transmitted by the polarization element. In the figure, the refraction coefficient of the glass plates is set to 1.5 and the determination performed.

As is apparent from the drawing, by forming the polarization element from 98 glass plates, the attenuation coefficient of the P-polarized light when the angle of incidence in the polarization element deviates 5° is roughly ½. When the number of glass plates is reduced, the above described attenuation coefficient becomes accordingly smaller. The above described condition (2) can therefore be satisfied when the polarization element is formed from a number of glass plates which is less than or equal to 98.

It became apparent from the above described circumstances that using a polarization element which is formed by inclination of several glass plates which are parallel to one another, a polarized light irradiation device can be formed for purposes of optical alignment of the alignment layer of a liquid crystal cell element. The number of glass plates which form the polarization element is greater than or equal to 8 and less than or equal to 98 and is a sufficiently feasible number to form the device.

Furthermore, it is necessary that the distance between the several parallel glass plates is greater than or equal to one of the longest wavelengths in the wavelength range of the light to be polarized. If the above described distance is less than or equal to this wavelength, the reflection of the S-polarized light in the above described wavelength range becomes less, by which ratio S/P cannot be reduced.

In the following, the optical alignment of the alignment layer of the liquid crystal cell element is described using the polarized light irradiation device shown in FIG. 1.

Figure 6:
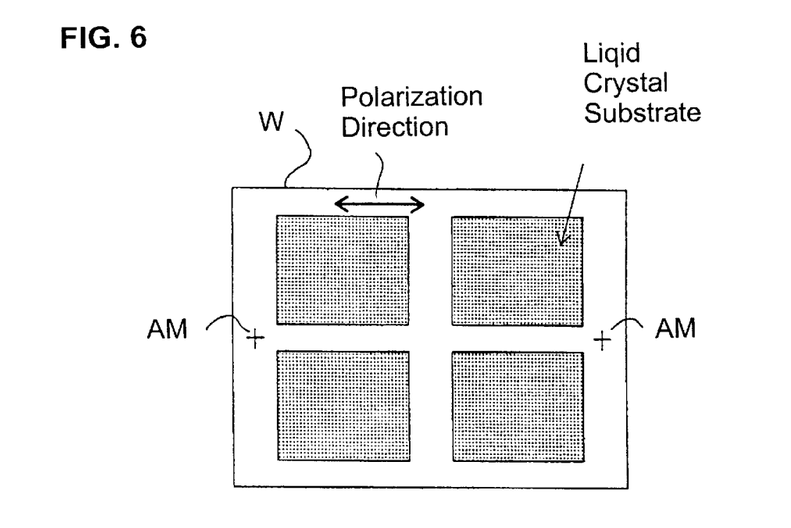
FIG. 6 is a schematic illustration of the relation between the direction of the workpiece and the polarization directions.

A. In the case of optical alignment by irradiation of the overall surface of a thin film with polarized light which is formed on a liquid crystal substrate:

The overall surface of the thin film of the liquid crystal substrate can be subjected to optical alignment by irradiating the overall surface of the thin film of the liquid crystal substrate, which is not aligned, with polarized light in the manner described below:

(1) In FIG. 1 workpiece W is placed on workpiece carrier 11, for example, as shown in FIG. 6. In the case of irradiation of the overall surface of the substrate with polarized light, mask M is not used.

Furthermore, mask M can also be used by which the light is transmitted only by the thin film part of the liquid crystal substrate.

(2) Workpiece carrier 11 is turned around the Z axis such that the polarization directions with respect to workpiece W become the directions shown in FIG. 6. But, polarization element 8 can also be turned so that the polarization directions become the directions shown in FIG. 6.

In the case of using mask M, the mask is placed on a mask carrier (not shown), by means of the alignment microscope alignment marks AM of mask M and workpiece W are observed, workpiece carrier 11 is driven in the X-Y-Θ directions and mask M is positioned relative to the workpiece W such that the alignment marks of mask M agree with alignment marks of workpiece W. In this case, mask M can also be adjusted beforehand such that their directions agree with the above described polarization directions.

(3) Shutter 4 is opened. Workpiece W is irradiated with polarized light for a stipulated period of time.

B. In the case of optical alignment by irradiation of part of the thin film with polarized light which is formed on a liquid crystal substrate: The alignment characteristic can be changed by irradiating a part of the liquid crystal substrate on which, by rubbing or optical alignment, an alignment layer is formed, with polarized light via the mask in the manner described below.

(1) In FIG. 1, mask M is placed on a mask carrier (not shown). As mask M, for example, a strip-shaped mask is used which screens half of one pixel of the liquid crystal cell element, as shown FIG. 7.

Figure 7:
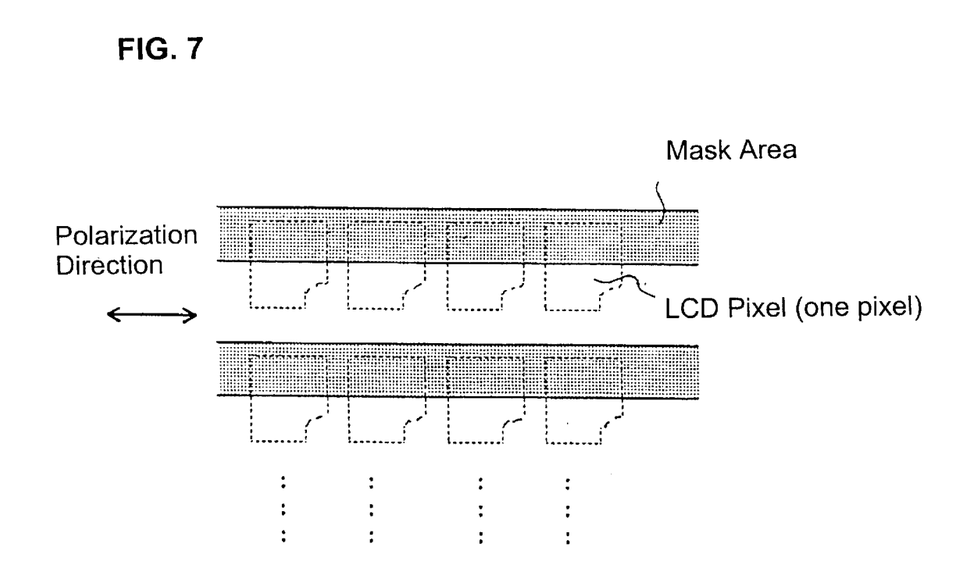
FIG. 7 shows a schematic illustration of the relation between the polarization directions and the pixels of mask patterns and liquid crystal substrates.

Mask M is adjusted such that the directions of polarized light emerging from polarization element 8 become parallel to the directions of the strips, as is shown in FIG. 7.

(2) Workpiece W is placed on workpiece carrier 11.

(3) Workpiece carrier 11 is moved in the Z direction such that the distance between mask M and workpiece W is a stipulated value. By means of alignment microscope 10, the alignment marks of the mask M and workpiece W are observed, and workpiece carrier 11 (or the mask carrier) is moved in such a way that the two alignment marks agree with one another. Thus, alignment is accomplished.

(4) Workpiece carrier 11 is moved in the Z-axis direction. The distance between mask M and workpiece W is set at the exposure distance.

(5) Shutter 4 is opened. Workpiece W is irradiated via mask M with polarized light with a stipulated duration.

Action of the Invention

As was described above, with the invention the following effects can be obtained:

(1) A large irradiated surface is obtained by the parallel arrangement of several glass plates with a distance to one another in the light irradiation device and by the arrangement of the polarization element on the exit side of the collimation lens or the collimation mirror which is formed by an inclining of these glass plates by the Brewster angle relative to the primary light beam. This yields a polarized light irradiation device which can execute irradiation with polarized light with uniform polarization directions. Therefore, the optical alignment of the alignment layer of the liquid crystal cell element can be performed with high efficiency.

(2) The polarizable wavelength range is not limited by the above described formation of the polarization element from several transparent glass plates which are each arranged in parallel at a distance to one another, as is the case in the polarization element using the vacuum evaporated film. In this way, an arrangement of a wavelength selective filter in front of the polarization element is made superfluous. Furthermore, there is no danger of loosening or degradation of the vacuum evaporated film, as is the case in the polarization element using the above described vacuum evaporated film.

It is to be understood that although a preferred embodiment of the invention has been described, various other embodiments and variations may occur to those skilled in the art. Any such other embodiments and variations which fall within the scope and spirit of the present invention are intended to be covered by the following claims.

What we claim is:

1. Polarized light irradiation device for optical alignment of an alignment layer of a liquid crystal cell element, comprising:

a lamp which emits light which contains UV light;

a focusing mirror which focuses the light from said lamp;

an integrator lens positioned to receive light reflected by said focusing mirror;

one of a collimation lens and a collimation mirror positioned to receive light from said integrator lens;

a polarization element on an exit side of said one of the collimation lens and collimation mirror and inclined at a Brewster angle relative to a primary light beam from said one of the collimation lens and collimation mirror, said polarization element being comprised of a number of glass plates which are parallel to one another and at a distance from each other;

wherein the number of glass plates of the polarization element is fixed such that a ratio of a component of vertical polarization S with respect to a component of parallel polarization P is less than or equal to 0.1; and wherein attenuation of light with parallel polarization P with reference to incident light with an inclination of ±5° relative to the Brewster angle is less than or equal to ½.

2. Polarized light irradiation device for optical alignment of an alignment layer of a liquid crystal cell element as claimed in claim 1, wherein the glass plates are formed from quartz glass.

3. Polarized light irradiation device for optical alignment of an alignment layer of a liquid crystal cell element as claimed in claim 1, wherein said number of glass plates of the polarization element is at least equal to 8 and is less than or equal to 98.

* * * * *